(12) United States Patent
Resh et al.

(10) Patent No.: US 10,501,216 B2
(45) Date of Patent: *Dec. 10, 2019

(54) SYSTEM AND METHOD FOR FRAMED LID

(71) Applicant: The Hillshire Brands Company, Chicago, IL (US)

(72) Inventors: Mary Lou Resh, Chicago, IL (US); Jason Kroeyr, Chicago, IL (US); Matt Guske, Chicago, IL (US); Jeff Czarny, Chicago, IL (US)

(73) Assignee: The Hillshire Brands Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/385,953

(22) Filed: Apr. 16, 2019

(65) Prior Publication Data

US 2019/0276169 A1 Sep. 12, 2019

Related U.S. Application Data

(63) Continuation of application No. 15/344,975, filed on Nov. 7, 2016, now Pat. No. 10,266,286.

(51) Int. Cl.
*B65B 7/28* (2006.01)
*B65D 43/02* (2006.01)
*B65B 5/04* (2006.01)
*B65D 77/20* (2006.01)

(52) U.S. Cl.
CPC .................. *B65B 7/28* (2013.01); *B65B 5/04* (2013.01); *B65D 43/0208* (2013.01); *B65D 77/2024* (2013.01); *B65D 2251/0018* (2013.01); *B65D 2251/0093* (2013.01); *B65D 2543/0024* (2013.01); *B65D 2543/00296* (2013.01); *B65D 2543/00314* (2013.01); *B65D 2577/2025* (2013.01); *Y02W 30/807* (2015.05)

(58) Field of Classification Search
CPC ......... B65B 7/28; B65B 5/04; B65D 43/0208; B65D 77/2024
USPC .... 220/359.1, 324, 315, 212, 801, 802, 803, 220/804, 805, 806, 796
See application file for complete search history.

(56) References Cited

U.S. PATENT DOCUMENTS

| | | | | |
|---|---|---|---|---|
| 3,394,861 A | * | 7/1968 | Truax | B65D 25/04 229/120.07 |
| 3,946,871 A | * | 3/1976 | Sturm | B65D 77/2044 220/359.2 |
| 2006/0032858 A1 | * | 2/2006 | Lee | B65D 21/0219 220/793 |
| 2007/0164028 A1 | * | 7/2007 | Marini | B65D 43/0212 220/258.2 |
| 2008/0093257 A1 | * | 4/2008 | Kim | B65D 5/4204 206/769 |

(Continued)

*Primary Examiner* — Viren A Thakur
*Assistant Examiner* — Chaim A Smith
(74) *Attorney, Agent, or Firm* — Duane Morris LLP

(57) ABSTRACT

The present disclosure describes a product package having a tray and a combination flexible/rigid lid design that comprises a rigid or semi-rigid frame and a flexible film that is transparent or translucent that is fixedly attached to the frame and releasably attached to the package tray. The novel product package is capable of maintaining a seal until opened by a consumer, allows a consumer to see the product through the lid, can be opened with a single step, and is resealable and/or reusable by the consumer.

20 Claims, 22 Drawing Sheets

(56) References Cited

U.S. PATENT DOCUMENTS

| | | | |
|---|---|---|---|
| 2008/0160143 A1* | 7/2008 | Edwards | B65D 1/34 |
| | | | 426/129 |
| 2015/0102035 A1* | 4/2015 | Tuan | B65D 53/02 |
| | | | 220/378 |
| 2015/0166232 A1* | 6/2015 | Lee | B65D 53/02 |
| | | | 220/315 |
| 2015/0297036 A1* | 10/2015 | Van Puijenbroek | B65D 77/0433 |
| | | | 426/124 |
| 2016/0207670 A1* | 7/2016 | Chou | B65D 43/0235 |
| 2017/0166367 A1* | 6/2017 | Minnette | B65D 51/20 |

\* cited by examiner

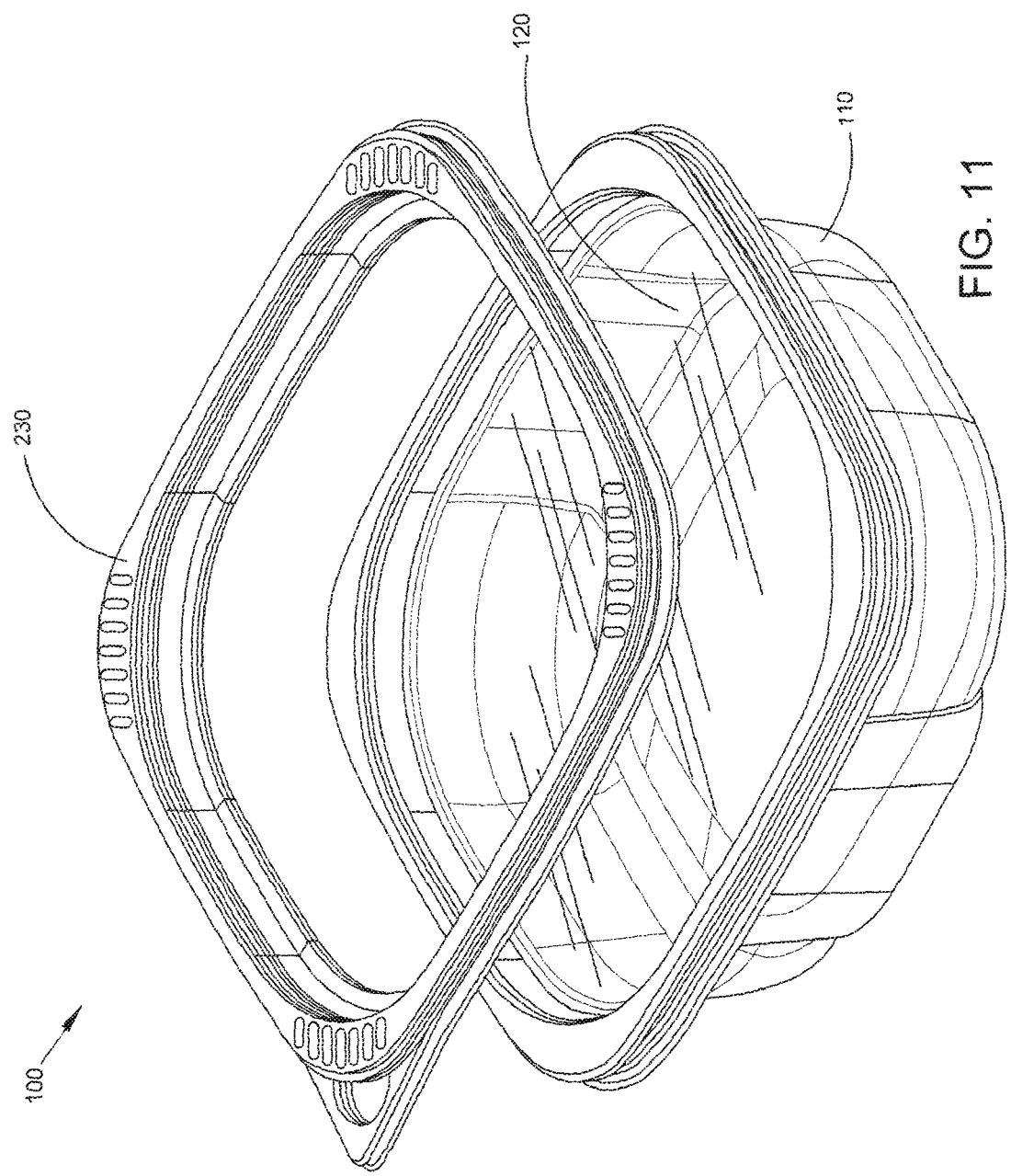

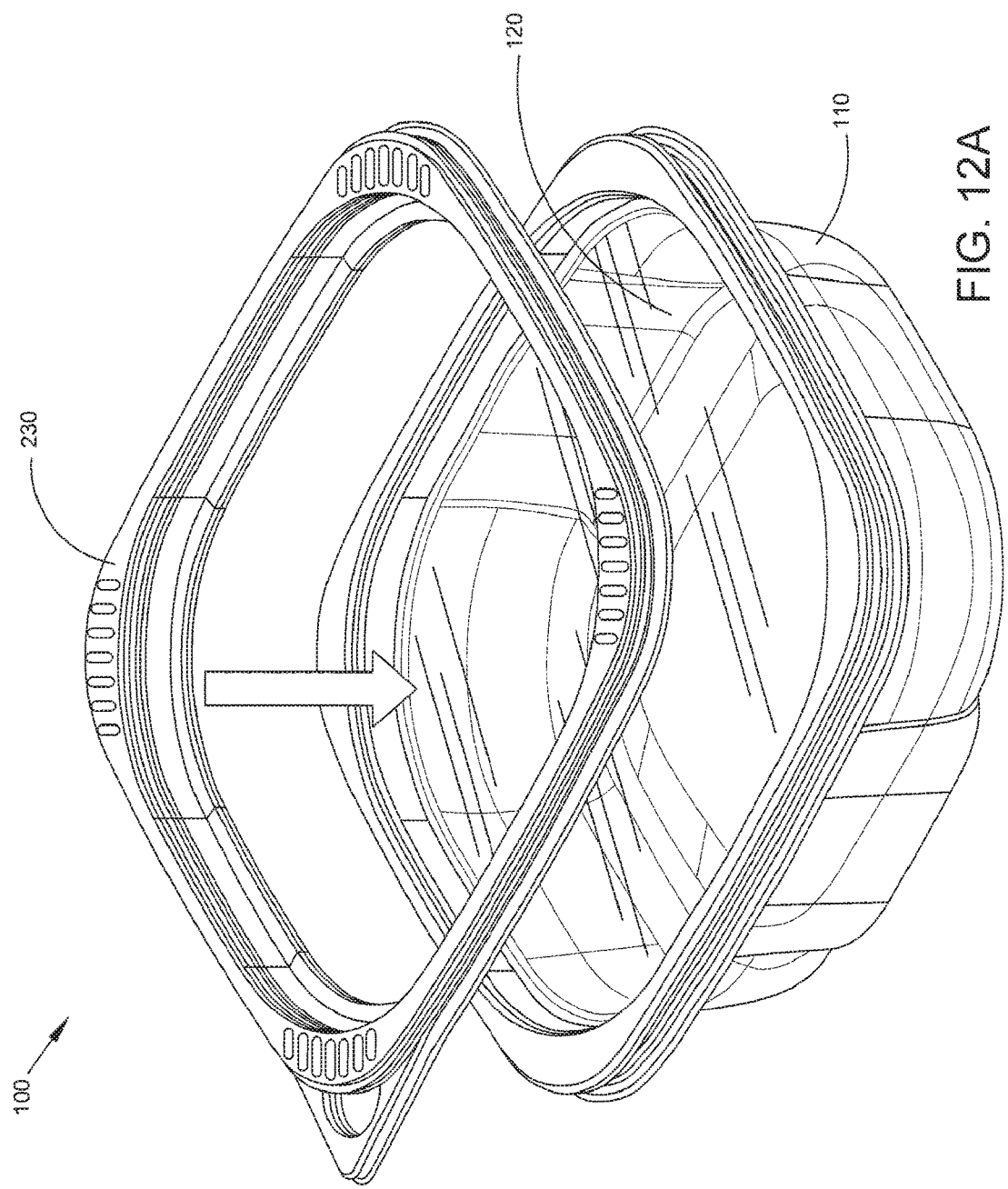

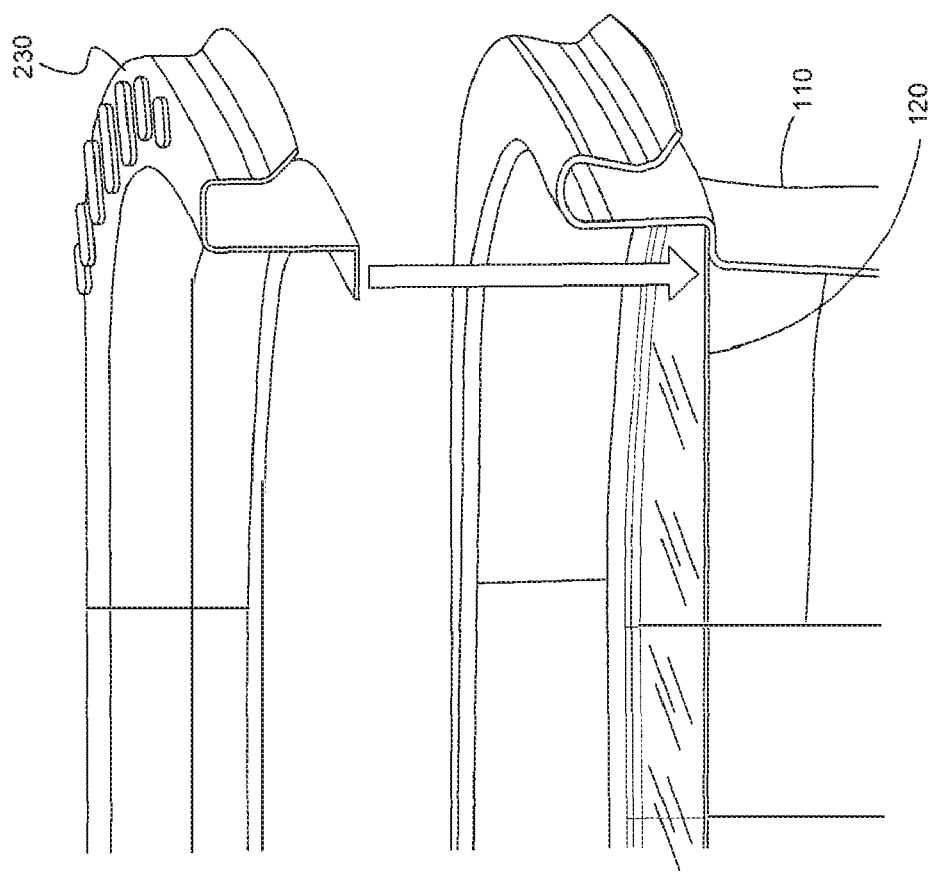

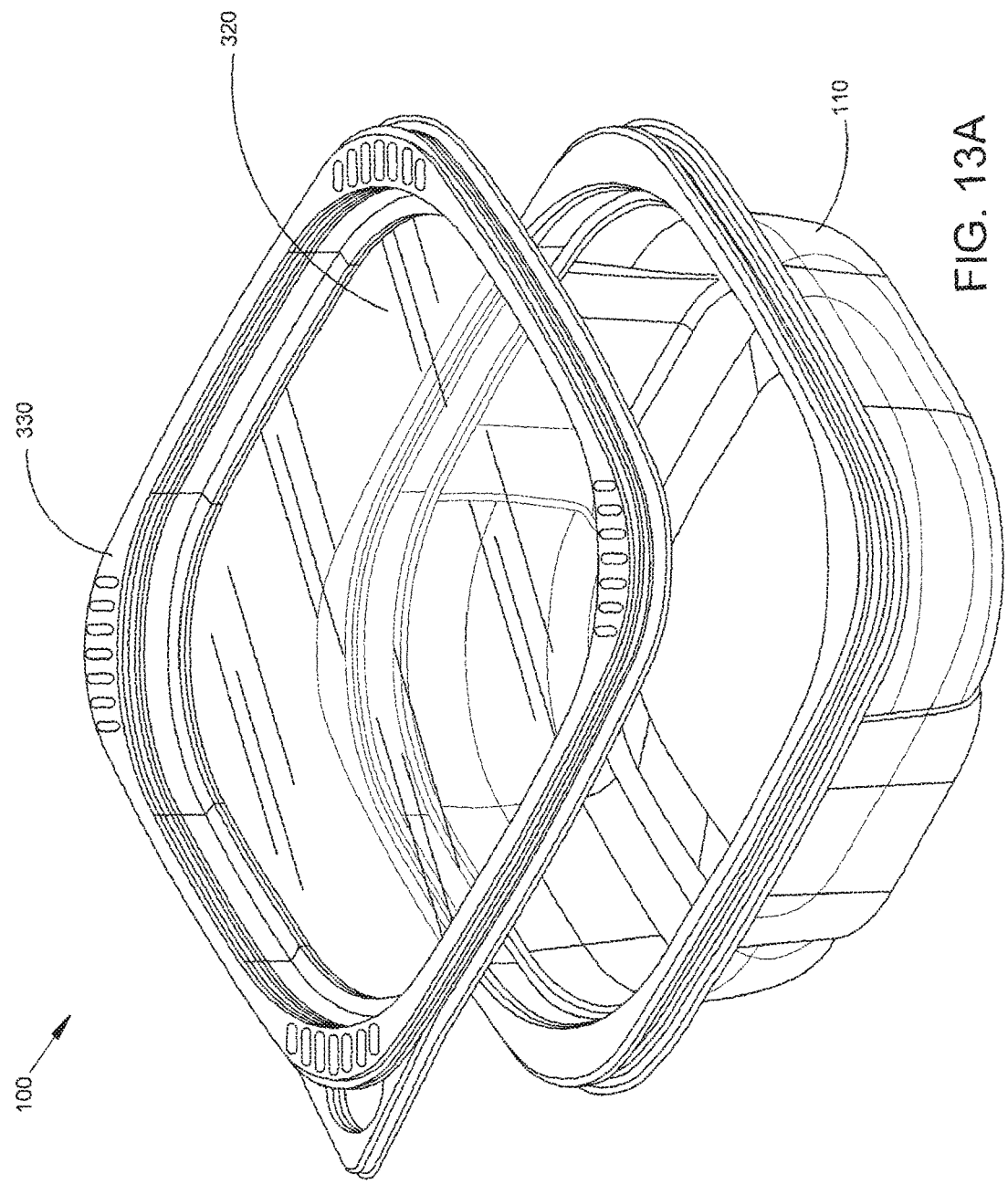

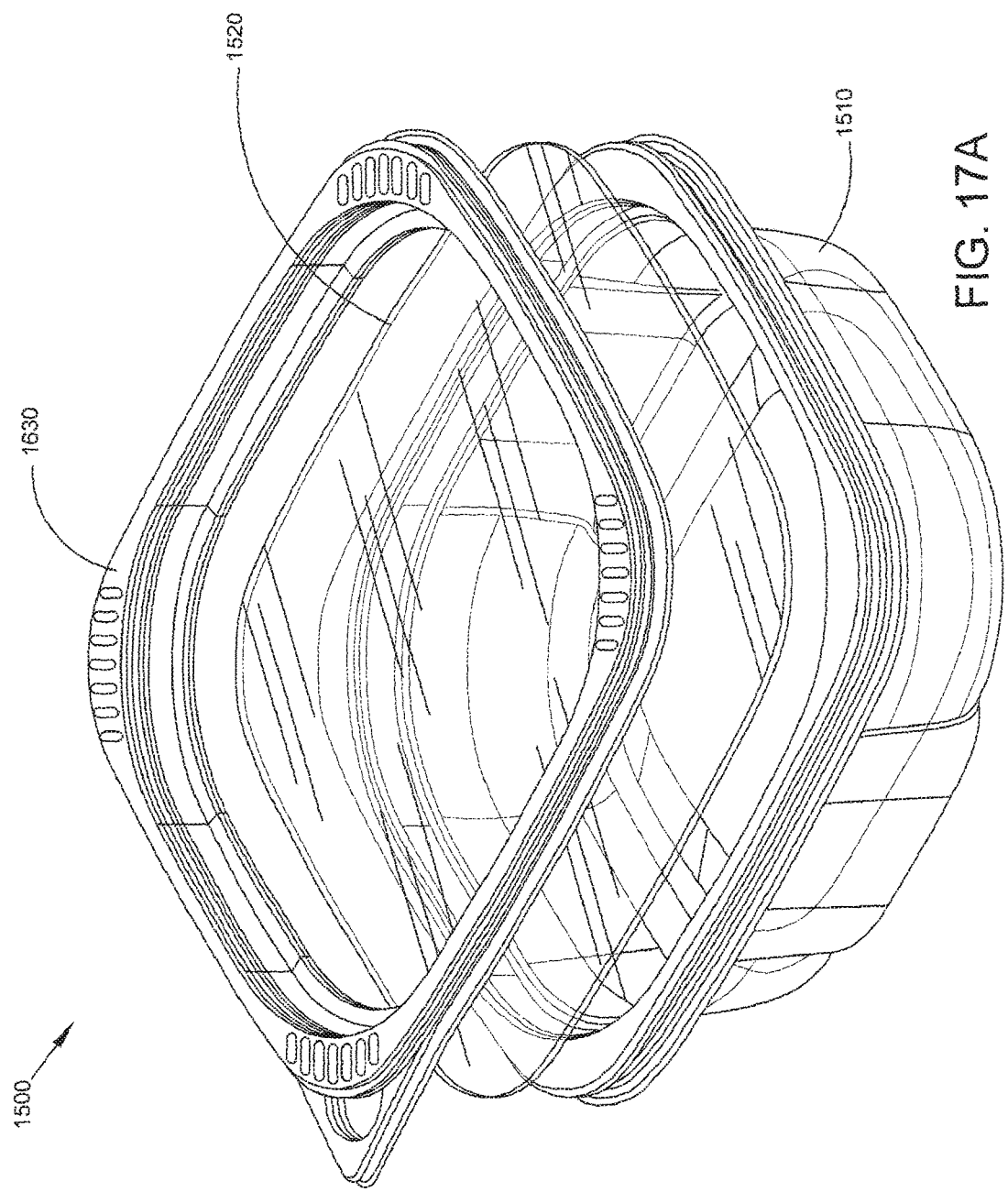

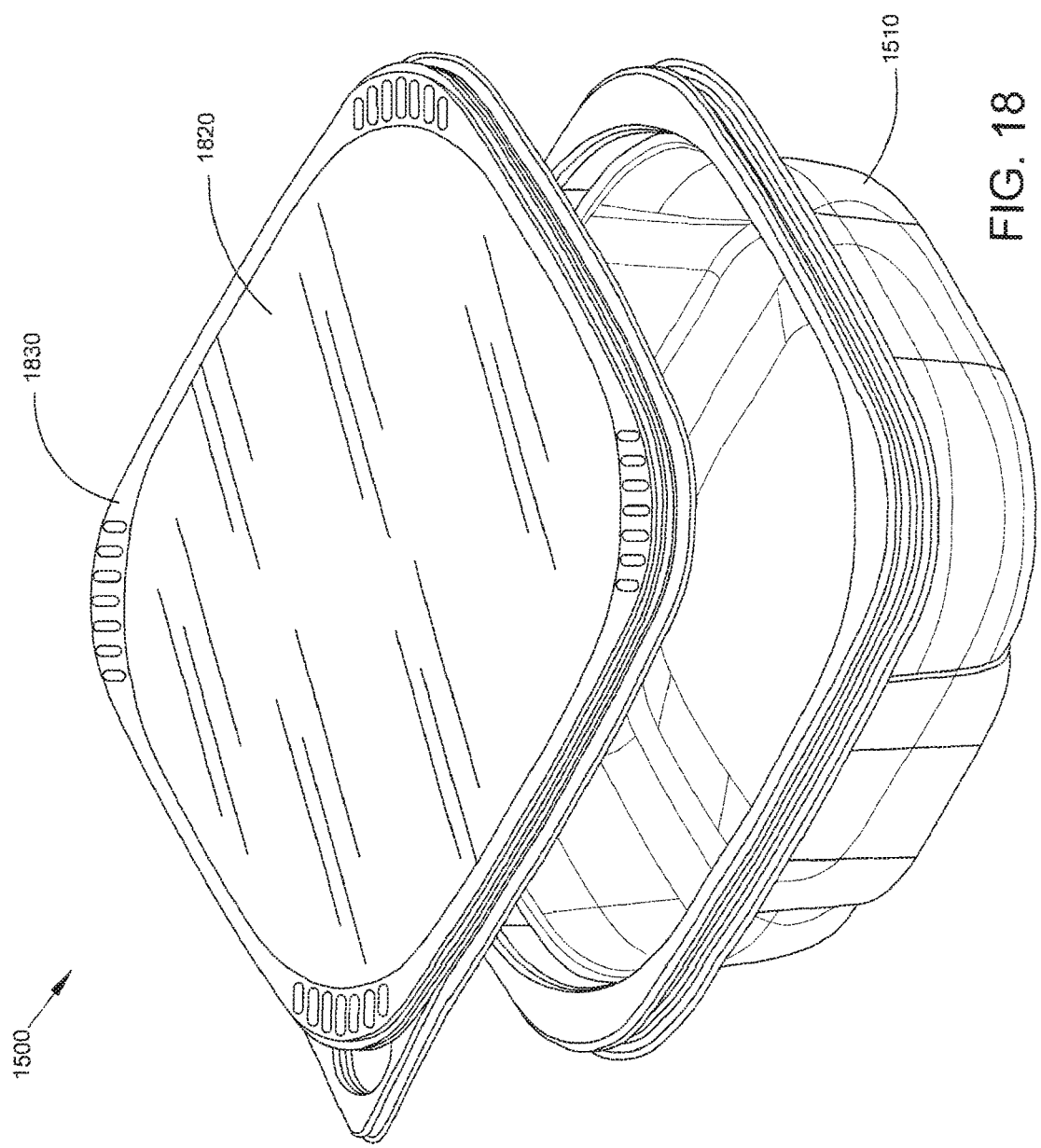

SYSTEM AND METHOD FOR FRAMED LID

RELATED APPLICATIONS

This application is a continuation of and claims priority to U.S. application Ser. No. 15/344,975 filed on 7 Nov. 2016, titled "System and Method for Framed Lid", the entirety of which is hereby incorporated herein by reference.

BACKGROUND

Product packages comprising a tray/tub with a film seal and/or a lid are known in the art. Some products require that they be kept sealed from the environment until opened by a consumer. However, current product packages with film seals are cumbersome for the consumer to use, are inefficient in design, and are limited in functionality.

Certain products require that the atmosphere in which they are stored be different than the standard environmental atmosphere and thus the product package must maintain the integrity of the modified atmosphere within the package. As a non-limiting example, some food packages require that the food product be held in a modified atmosphere. Other product packages may have different modified atmospheric requirements, such as an inert gas, nitrogen, etc. Each of these product packages must maintain their respective modified atmospheres for a reasonable period of time so that the product is sold to the consumer in the state intended by the seller.

In the case of food product packages, some tray-with-lid packages have difficulty maintaining a modified atmosphere within the package and therefore the food product is required to be sealed in a pouch which is placed within the tray. While the lid on such a package may be used more than once by the consumer, the product must still be placed in a sealed pouch prior to purchase which requires extra manufacturing steps, additional processing time, further materials, and consequently higher cost. Additionally, the consumer must perform two separate steps to open the package: a first step to remove the lid from the tray, and a second step to remove the product from the pouch.

Other food product packages which have a film sealed to the top of the tray are able to maintain the modified atmosphere inside the package until opened by the consumer. However, these tray-film-lid packages also suffer from similar drawbacks. For example, the consumer must still perform two separate steps to open the package: a first step to remove the lid, and a second step to remove the film.

Still other food packages may only have a tray-with film construction. While these packages only require one step to remove the film, these types of packages are not resealable or reusable by the consumer without resorting to the use of a different sealing material, e.g., a cling-type film, aluminum foil, etc.

Accordingly, there is a need for product packages which are easier to manufacture, easier for the consumer to open, require fewer resources to produce, and are resealable and/or reusable by the consumer.

BRIEF DESCRIPTION OF THE DRAWINGS

FIGS. 10-14 are various depictions of the exemplary product package of FIG. 1 illustrating details of the interaction of various parts during assembly and/or use of the product package according to an embodiment of the present subject matter.

FIGS. 15-19 are various depictions of another exemplary product package illustrating details of the interaction of various parts during assembly and/or use of the product package according to an embodiment of the present subject matter.

DETAILED DESCRIPTION

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of embodiments of the present subject matter may be directed towards or reference specific systems and/or methods for a product package, it is to be understood that the discussion is not intended to limit the scope of the present subject matter in any way and that the principles presented are equally applicable to other systems and/or methods for a product package.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

With reference to the figures where like elements have been given like numerical designations to facilitate an understanding of the present subject matter, various embodiments of a system and method for a novel product package are described.

Figure 1:
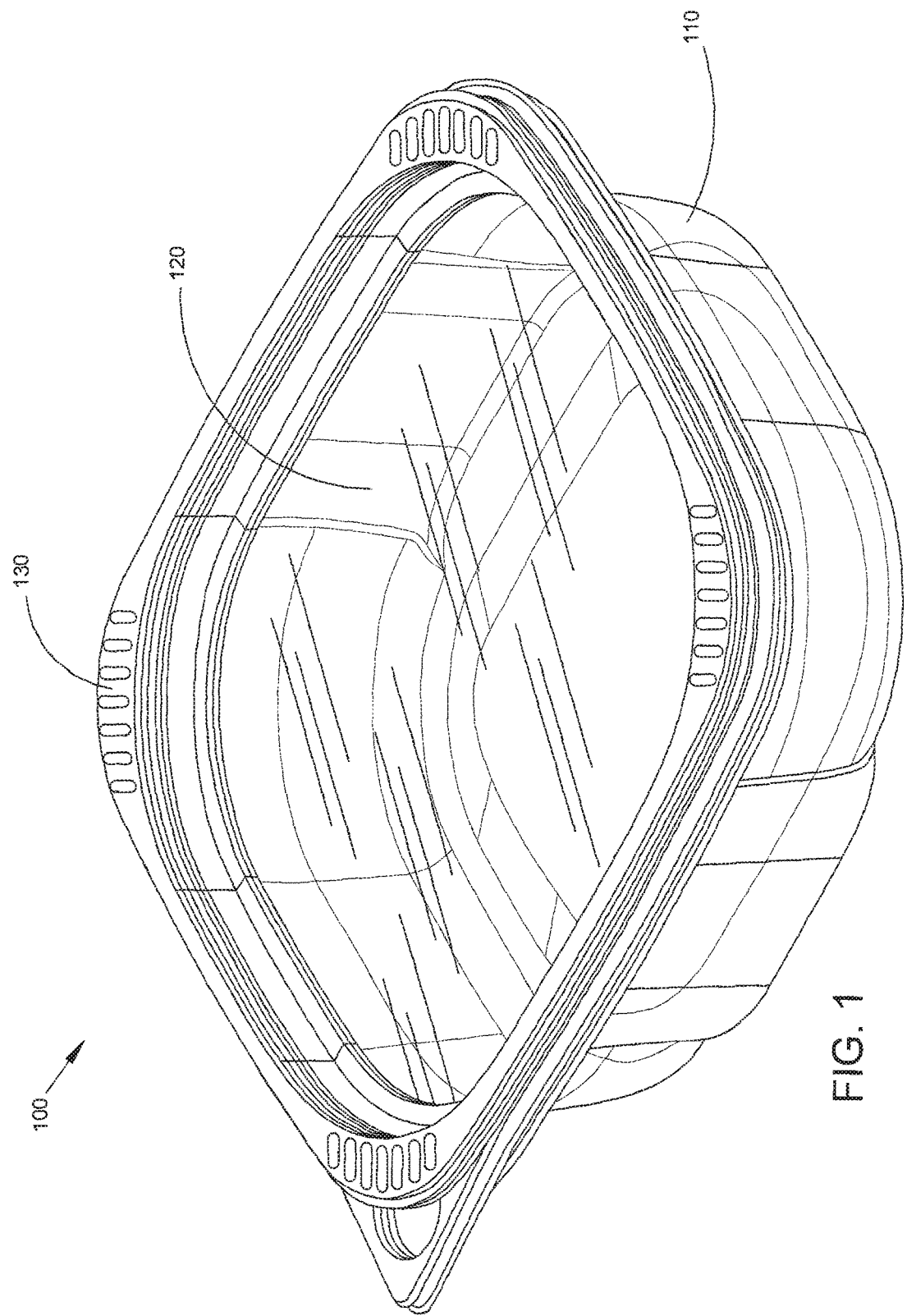
FIG. 1 is an isometric view of an exemplary product package showing a tray, a film or sealing film, and a lid according to an embodiment of the present subject matter.

With attention drawn to FIG. 1, an isometric view of an exemplary product package 100 is depicted showing a tray/tub 110 (generally referred to herein as a "tray"), a film or sealing film 120, and a lid 130 according to an embodiment of the present subject matter. In an embodiment, the tray 110 may be made of a rigid or semi-rigid plastic and may be translucent. The sealing film 120 is typically flexible and transparent, but may be translucent, and acts to hermetically seal the interior of the product package from an external environment. The lid 130 may be made of a rigid or semi-rigid plastic and may be translucent. In the embodiment shown in FIG. 1, the lid 130 may be formed in a ring-like or frame structure with the sealing film 120 spanning and/or enclosing the center hole in the lid. Thus, the lid/film structure shown in FIG. 1 and throughout the other figures may be a hybrid rigid/flexible construction with superior viewing and sealing properties. For embodiments where the sealing film 120 is transparent, a product placed in the product package 100 may be placed with a "good" side up to be viewed by a consumer through the sealing film 120. This is a more convenient product orientation for the consumer than prior art packages which do not have transparent tops and therefore require the "good" side of the product to face downward for necessitating the consumer to pick up the package and view the product through the bottom of the package.

Further, the product package 100 is sealable, reusable, and leak-proof thus providing additional benefits to the consumer. In some embodiments, the product package 100 is also resealable in an airtight and/or watertight manner. Because the sealing film 120 seals an interior space of the product package 100 from an external environment, the product carried within the interior space (e.g., a food product) need not be sealed within an inner pouch before being placed in the interior space. The elimination of the inner pouch allows for better product definition and visibility and better presentation of the product to the consumer.

Another benefit attributable to the novel design of the product package 100 is the reduction of materials required to make the package. Since, in particular embodiments, the lid 130 is a ring-like or frame structure, the material required to manufacture this type of lid is less than the material required to manufacture a whole lid (i.e., without the hole in the middle). This reduction in material may further lead to improvements in case packing, stacking, pallet, and transportation efficiencies. The reduction in material may also afford increased run rates on the production line allowing for more finished goods to be produced. Additional benefits due to the elimination of the inner pouch include: the overall package may be smaller (e.g., have a smaller height) while holding the same quantity of product; the package may be the same size as before but with an increase in the product contained therein; and/or a smaller package size leads to a reduction in the amount of materials needed, reduced packing and stacking heights, and the ability to carry more packages on a pallet.

As will be discussed in more detail below, an important benefit is the ease of accessibility of the product by the consumer since the consumer can access the product in one step rather than taking multiple steps as current packages require.

Figure 2:
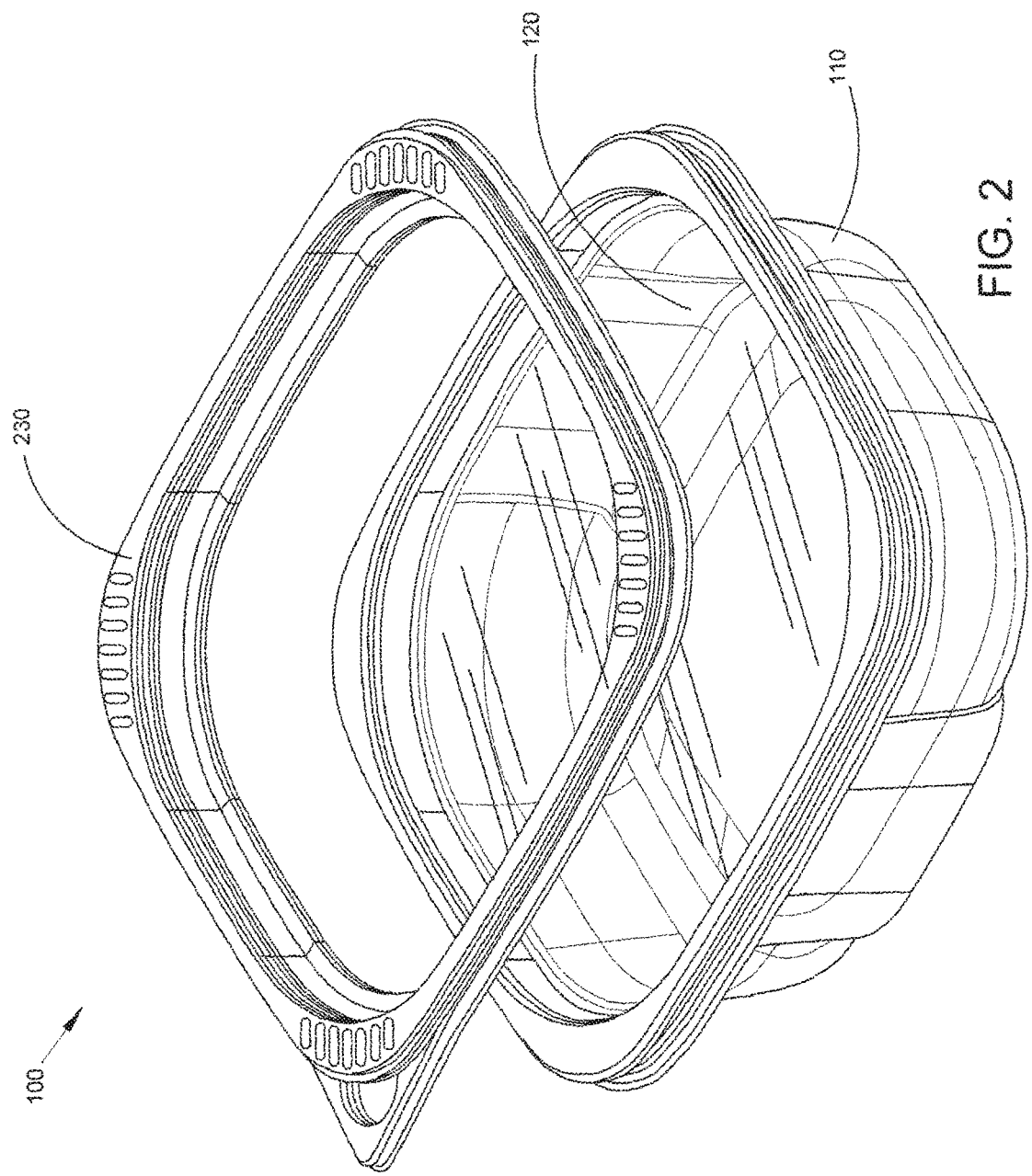
FIG. 2 is a partially-exploded isometric view of the exemplary product package of FIG. 1 during assembly with the sealing film releasably attached to the tray before the lid is engaged with the tray according to an embodiment of the present subject matter.

Now turning to FIG. 2, a partially-exploded isometric view is presented of the exemplary product package 100 of FIG. 1 during assembly with the sealing film 120 releasably attached to the tray 110 before the lid 230 is engaged with the tray according to an embodiment of the present subject matter.

In an embodiment for assembling the product package 100 including a product (not shown for clarity), the product is placed in an interior space of the product package 100 (e.g., the product is placed in the tray 110). The tray 100 is then gas flushed and the sealing film 120 (which, in an embodiment, may be a laminated film) is releasably sealed directly to the tray 110. The sealing film may be sealed to the tray in a predetermined fashion, such as, for example, the film contacting the rim of the tray (e.g., the rim of the sidewall(s) of the tray) or the film contacting a ledge formed in the sidewall(s) of the tray, as will be described in further detail below. In an embodiment, the portion of the film contacting the rim of the tray will comprise a material that will allow for an "easy peel away" function, i.e., be releasably sealed to the rim (or ledge) of the tray. Once the sealing film 120 is attached to the tray 110, the lid 230 will then be applied to the tray/film assembly. The portion of the sealing film 120 that is in contact with the lid 230 will comprise a material that will allow for a relatively permanent bond between the sealing film 120 and the lid 230 thereby creating a functional leak-proof, resealable, re-useable product package.

As stated above, an additional benefit of the novel product package is the elimination of an inner pouch for holding a product in a modified atmosphere. Also, the hybrid rigid/flexible lid/film covering creates an enhanced leak proof, resealable, and reusable finished package. Furthermore, the novel product package allows for printing to appear on the film, such as a design or text, and be product specific with a variety of lid colors, and allows for a colored rim and a clear window in the lid formed by the film to showcase the product for increased product definition and visibility. Current prior art packages are typically limited to one color and require a cardstock or label to be attached to the lid or elsewhere on the package to show graphics.

Figure 3:
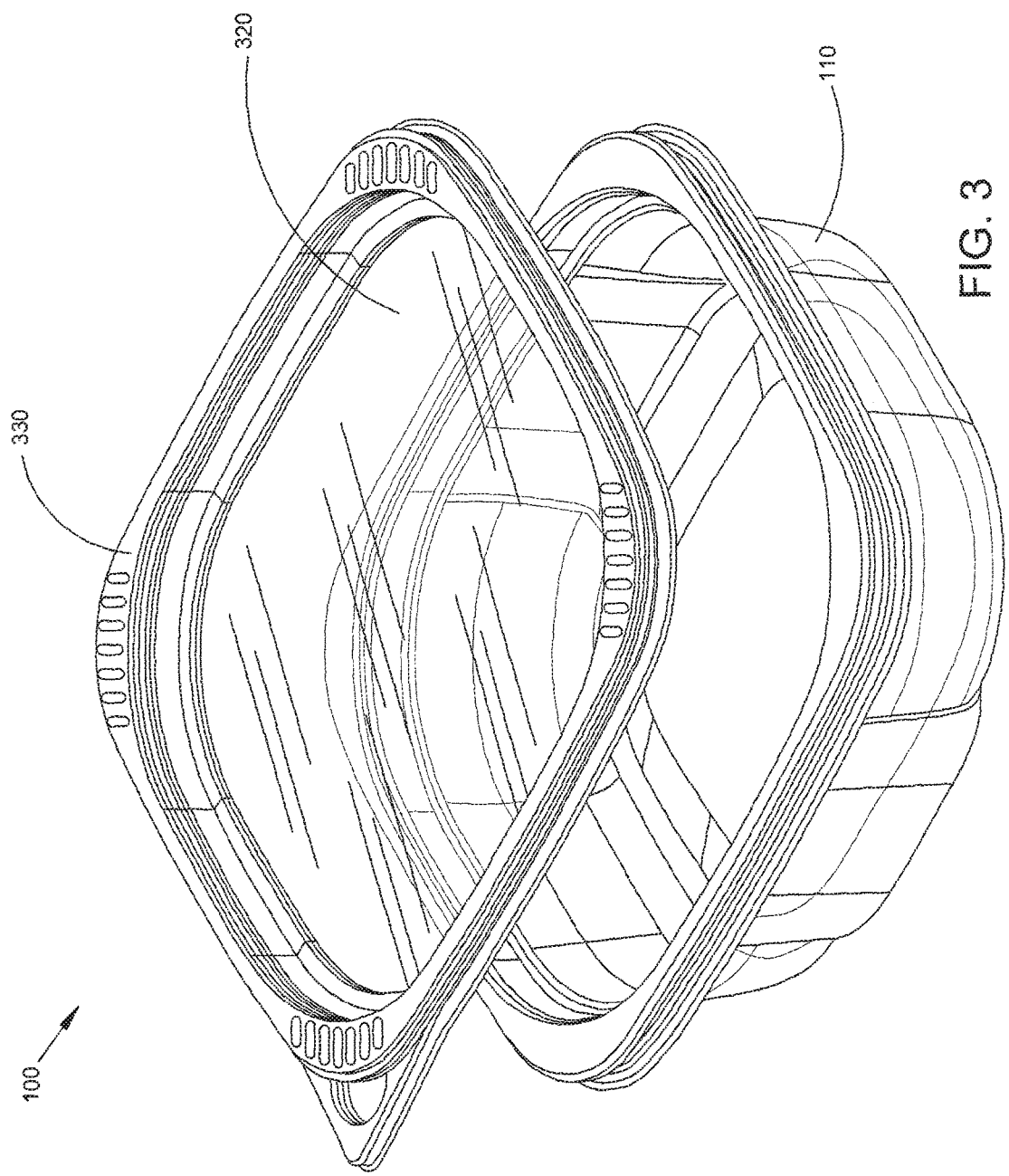
FIG. 3 is a partially-exploded isometric view of the exemplary product package of FIG. 1 during use by a consumer showing the lid and adhering sealing film being removed from the tray according to an embodiment of the present subject matter.

FIG. 3 illustrates a partially-exploded isometric view of the exemplary product package 100 of FIG. 1 during use by a consumer showing the lid 330 and the adhering sealing film 320 being removed from the tray 110, according to an embodiment of the present subject matter. As illustrated in FIG. 3, a consumer may access a product in the product package 100 by simply removing the lid/film assembly in one step. As discussed above, the sealing film, as shown in FIG. 2, is initially releasably sealed to the tray 110 thereby hermetically sealing the interior of the package from an external environment (and allowing for a modified environment to exist within the package). The sealing film is also more permanently attached to the lid 230 after the lid is engaged to the tray 110 during manufacturing. As shown in FIG. 3, when the lid/rim is removed from the finished package by the consumer, the sealing film 320 will release from the tray 110 and stay permanently attached to the lid 330. Prior art packages require more than one step for a consumer to access the product whereas a unique feature of the novel product package 100 is a "one-step" opening aspect where the consumer can open the package and access the product in just one step thereby increasing the utility of the product for the consumer.

Figure 4:
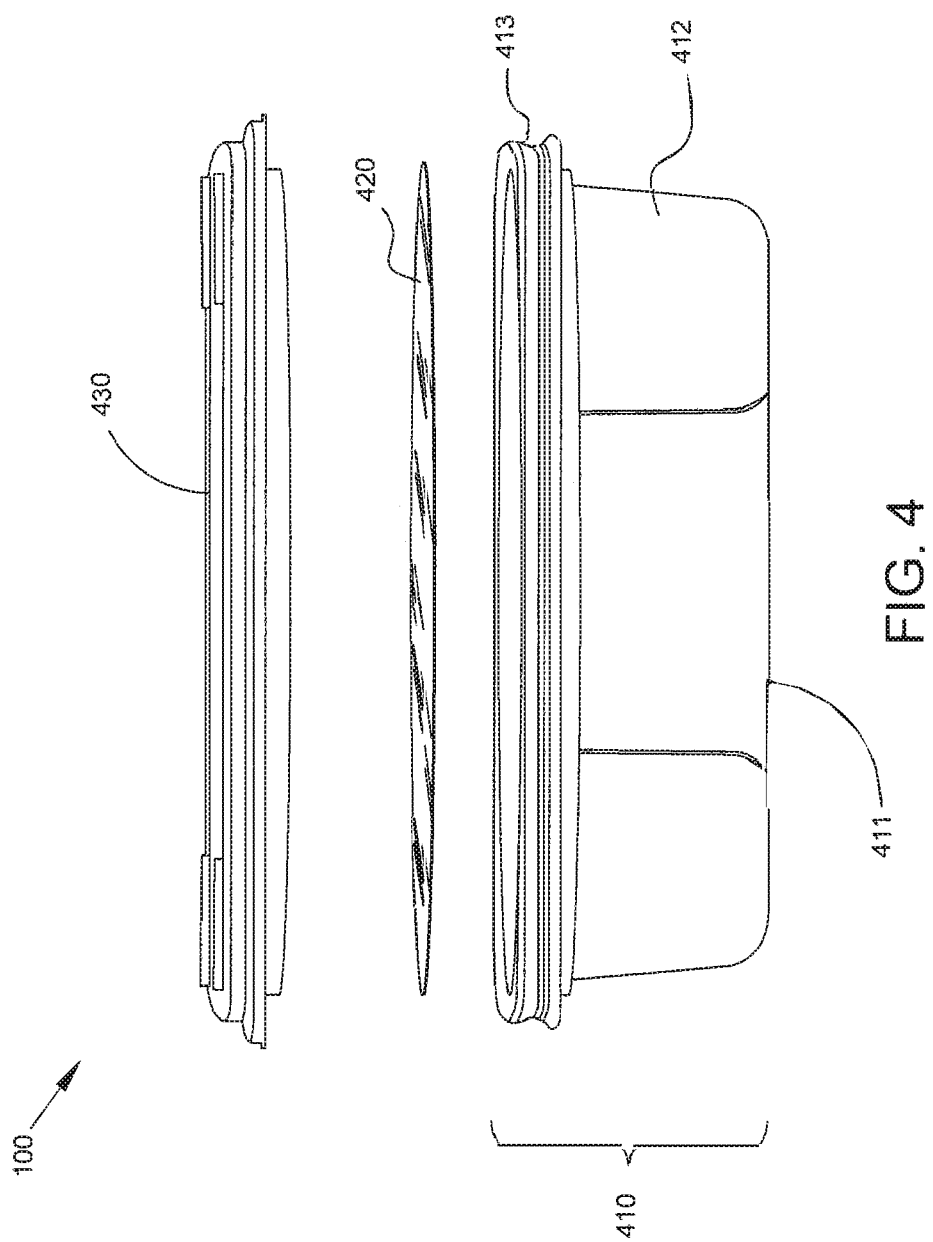
FIG. 4 is an exploded elevation view of an exemplary product showing the tray, the sealing film, and the lid according to an embodiment of the present subject matter.

Considering FIG. 4, an exploded elevation view is presented of an embodiment of an exemplary product package 400 showing the various components of the product package: a tray 410, a sealing film 420, and a lid 430. The tray 410 may comprise a base portion 411 and at least one sidewall 412 having a rim 413. While the product package 400 is depicted as being generally rectangular, any geometric shape is contemplated consistent with the teachings presented herein.

Figure 5:
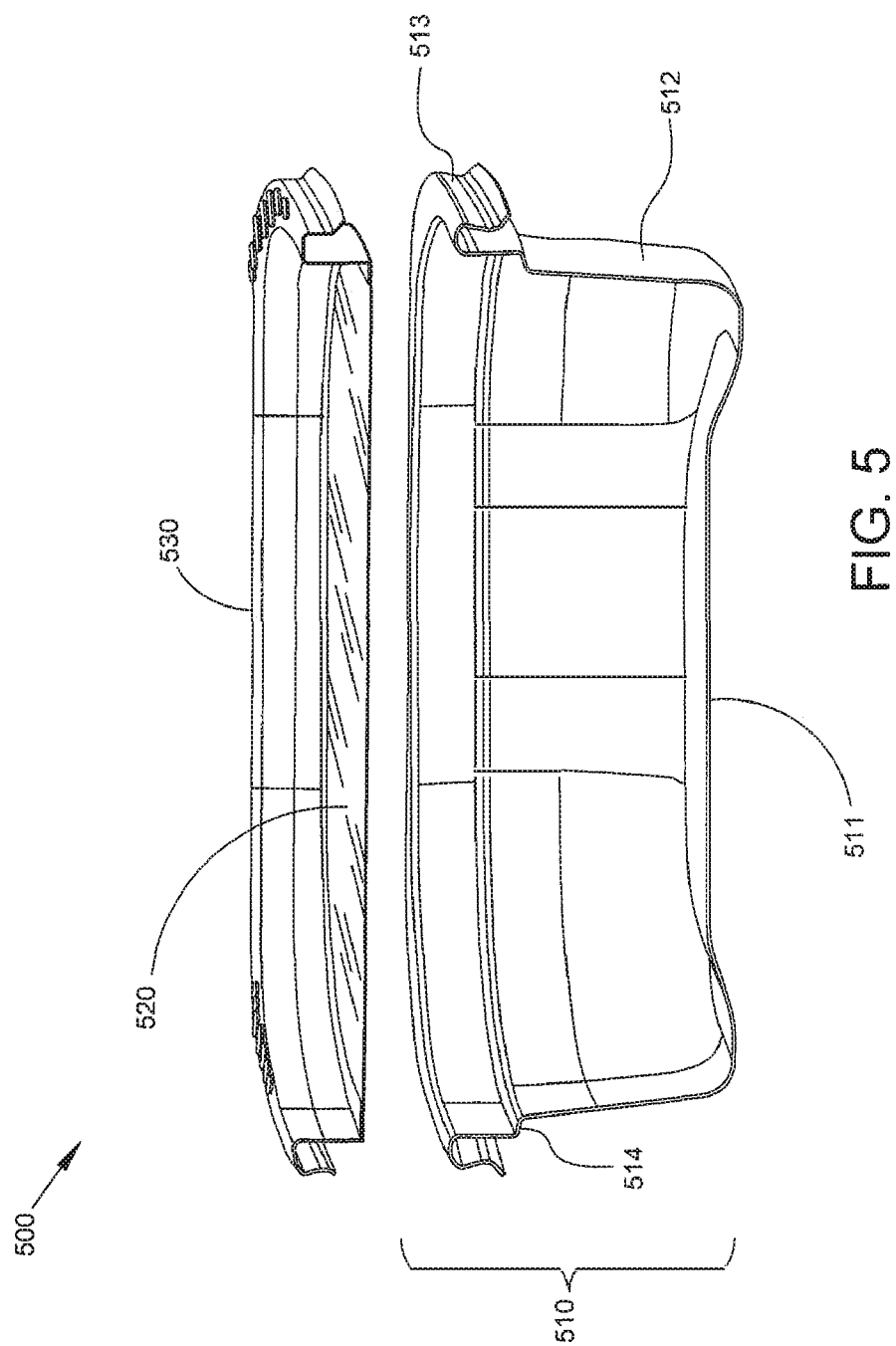
FIG. 5 is a cross-sectional view of an exemplary product package showing the sealing film adhering to the lid during use of the product package by a consumer and a ledge on a sidewall of the product package, according to an embodiment of the present subject matter.

Now considering FIG. 5, a cross-sectional view of an exemplary product package 500 showing the sealing film 520 adhering to the lid 530 during use of the product package by a consumer, according to an embodiment of the present subject matter. The tray 510 comprises a base portion 511 and at least one sidewall 512 having a rim 513. Also shown in this embodiment is a ledge 514 formed on a sidewall 512 between the base 511 and the sidewall rim 513. The sealing film 520 may be releasably attached to the ledge 514 to seal the inner space of the product package 500 from an external environment. Alternate embodiments allow for the sealing film 520 to attach to a sidewall 512 without the presence of a ledge, such as, for example, to the rim 513 which is discussed further below with respect to FIG. 8.

Figure 6:
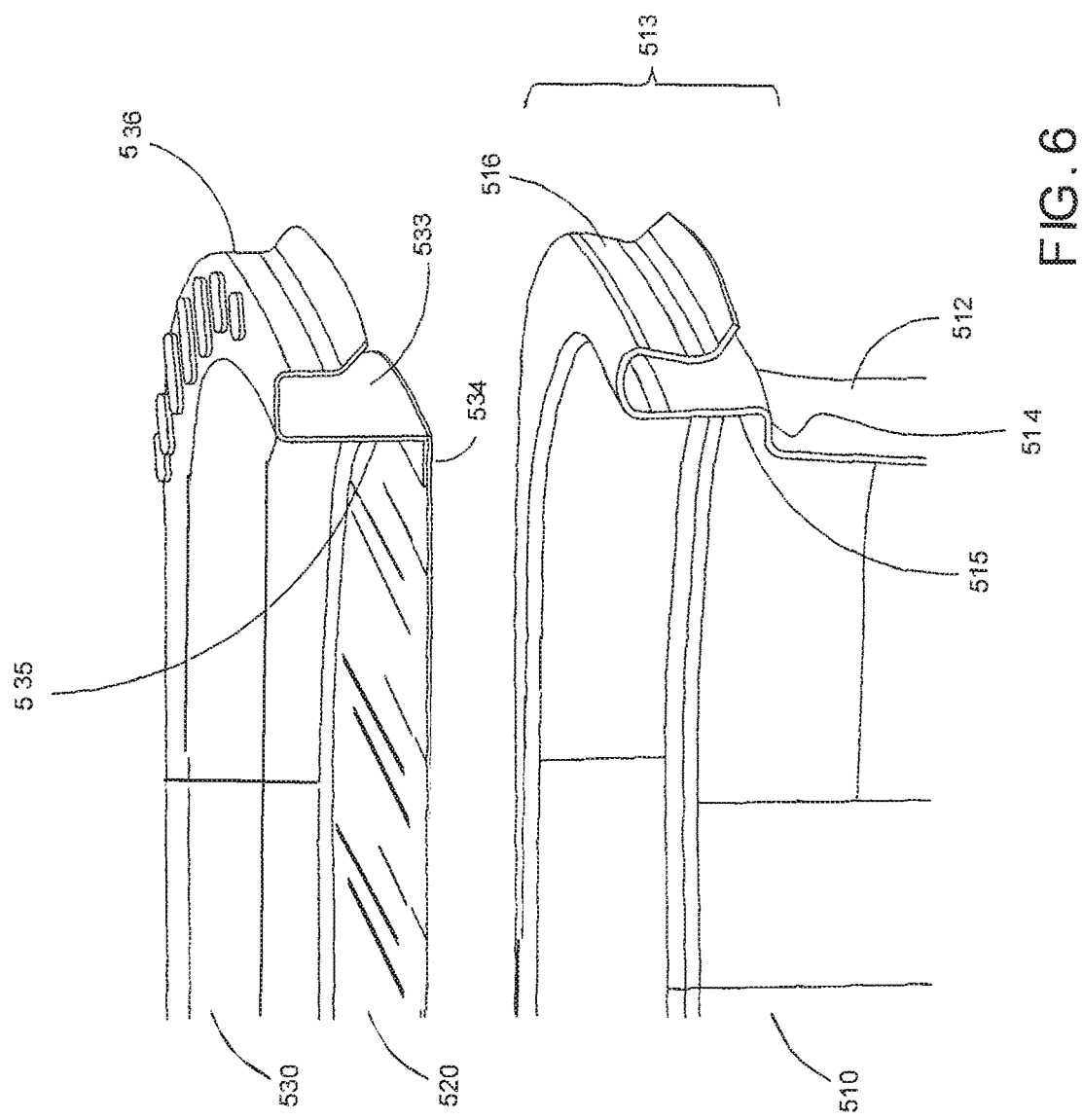
FIG. 6 is an exploded isometric view of the exemplary product package of FIG. 5 illustrating detail of the lid, sealing film, sidewall, sidewall rim, and ledge, according to an embodiment of the present subject matter.

FIG. 6 illustrates an exploded isometric view of the exemplary product package 500 of FIG. 5 illustrating detail of the lid 530, the sealing film 520, sidewall 512, sidewall rim 513, and the ledge 514, according to an embodiment of the present subject matter. As can be seen in this embodiment, the sidewall rim 513 is formed in an inverted U-shape having an inner rim wall 515 and an outer rim wall 516. The lid 530 includes a channel 533, also formed in an inverted U-shape, for receiving the sidewall rim 513 when the lid is positioned on the tray 510. In this embodiment, the lid 530 is formed as a ring and/or frame as shown in FIGS. 1-3, and the channel 533 is formed by an inner lid wall 535 and an outer lid wall 536. The inner lid wall 536 includes a flange 534 to which the sealing film 520 may be fixedly attached. The flange 534 is dimensioned to mate with the ledge 514 with the sealing film 520 disposed therebetween. The ring/shaped lid 530 circumscribes an opening that is spanned by the sealing film 520. In an embodiment, the lid 530 engages the sidewall rim 513 by an interference fit between the inner lid wall 535 and the inner rim wall 515. In another embodiment, the lid 530 engages the sidewall rim 513 by an interference fit between the outer lid wall 536 and the outer rim wall 516. In a further embodiment, the lid 530 engages the sidewall rim 513 by an interference fit between the inner lid wall 535 and the inner rim wall 515 and by an interference fit between the outer lid wall 536 and the out rim wall 516.

Figure 7:
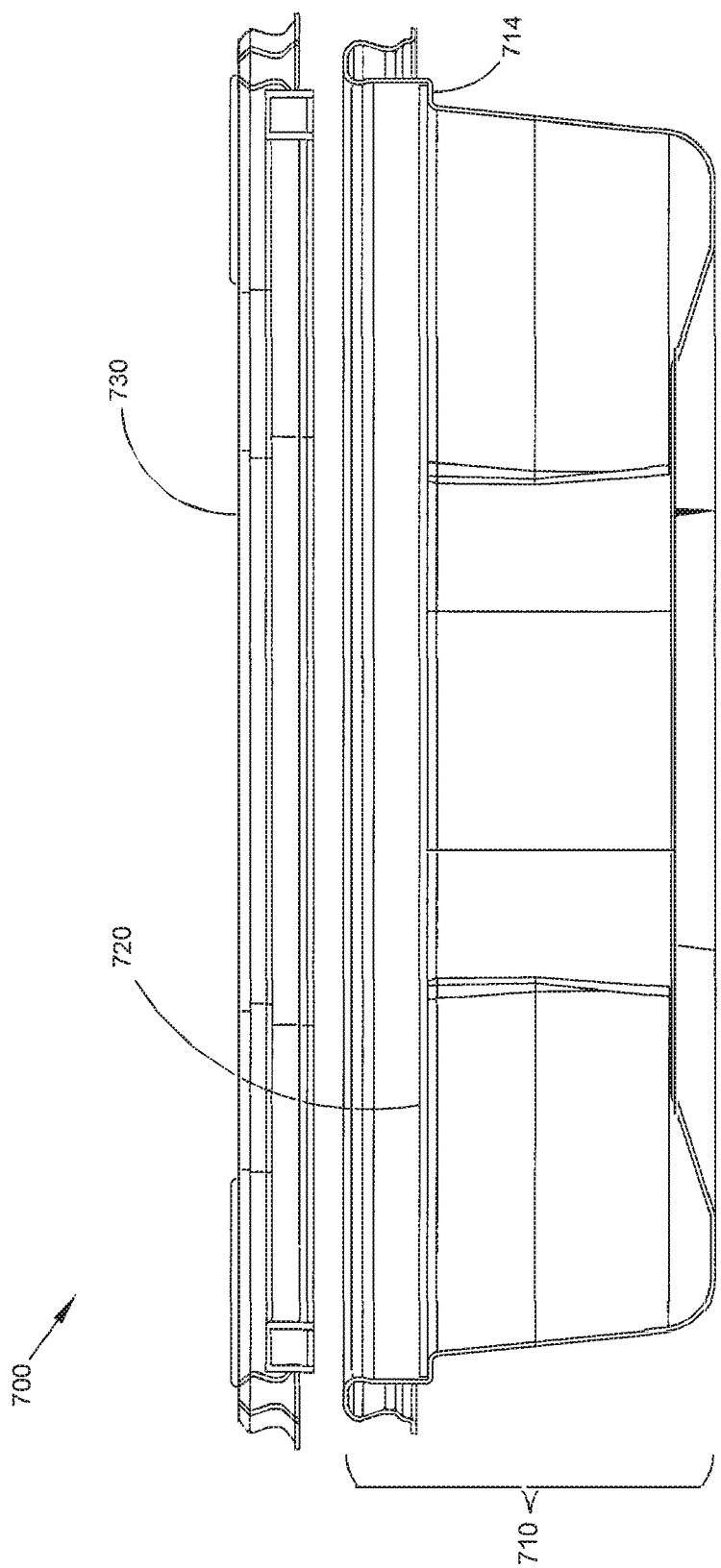
FIG. 7 is a cross-sectional view of an exemplary product package during assembly with the sealing film releasably attached to the tray before the lid is engaged with the tray according to an embodiment of the present subject matter.

FIG. 7 depicts a cross-sectional view of an exemplary product package 700 during assembly with the sealing film 720 releasably attached to a ledge 714 in a sidewall of the tray 710 before the lid 730 is engaged with the tray, according to an embodiment of the present subject matter. As discussed above, the lid 730 will be positioned on the tray 710 and fixedly attached to the sealing film 720. A consumer may then access the interior space of the product package 700 by disengaging the lid 730 from the tray 710 thereby removing the sealing film 720 from the ledge 714.

Figure 8:
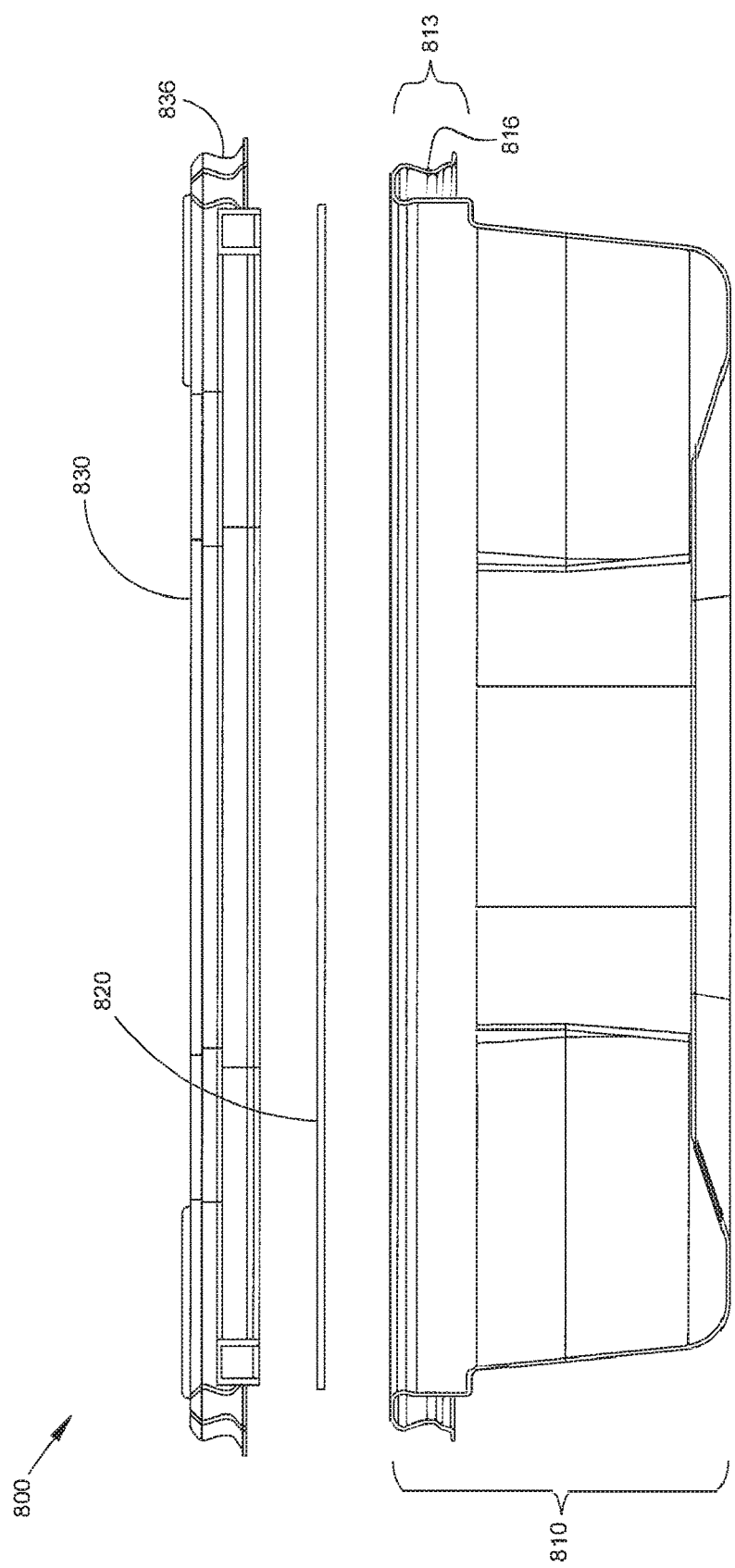
FIG. 8 is a cross-sectional view of an exemplary product package during assembly showing a tray, a sealing film, and a lid according to another embodiment of the present subject matter.

With attention now drawn to FIG. 8 a cross-sectional view of an exemplary product package 800 during assembly showing a tray 810, a sealing film 820, and a lid 830, according to another embodiment of the present subject matter. In this embodiment, the sealing film 820 is releasably attached to the rim 813 of a sidewall of the tray 810. The lid 830 is positioned on the tray 810 and fixedly attached to the sealing film 820. The lid 830 may be ring-shaped, as discussed above, or may be a whole lid. In this embodiment, the lid 830 engages the rim 813 by an interference fit between an outer lid wall 836 and an outer rim wall 816.

Figure 9:
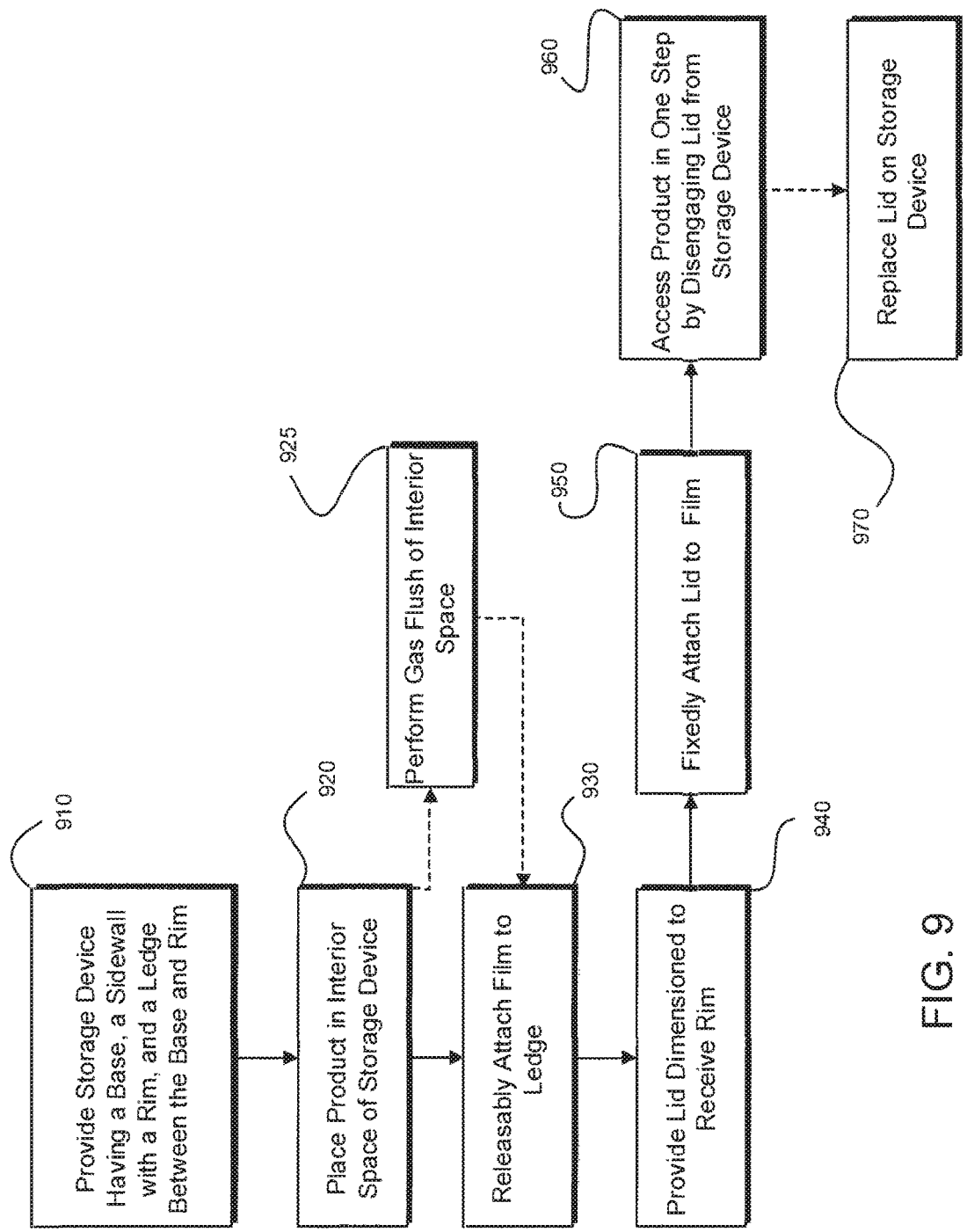
FIG. 9 is a flow chart of steps for a method for accessing a product contained within a product package as described herein, according to an embodiment of the present subject matter.

FIG. 9 is a flow chart of steps for a method for accessing a product contained within a product package as described herein, according to an embodiment of the present subject matter. At block 910, a storage device is provided where the storage device comprises a base connected to at least one sidewall which extends away from the base terminating at a rim and comprises a ledge formed between the base and the rim. At block 920, a product is placed in an interior space of the storage device. At block 930, a film is releasably attached to the ledge to seal the interior space of the tray from an external environment. At block 940 a lid is provided where the lid is dimensioned to receive the rim when the lid is positioned on the storage device. At block 950, the lid is fixedly attached to the film. At block 960, the product is accessed in one step by disengaging the lid from the storage device thereby removing the film from the ledge.

In another embodiment, at block 925 a gas flush of the interior space is performed after the product is placed in the interior space. In a further embodiment, at block 970, the lid is replaced on the storage device.

FIGS. 10-14 are various depictions of the exemplary product package of FIG. 1 illustrating details of the interaction of various parts during assembly and/or use of the product package according to an embodiment of the present subject matter. For the sake of simplicity, no product is shown in the package or discussed during the various stages of assembly and/or use of the package although those of skill in the art will readily understand that product would be placed in the product package at the appropriate time during assembly and in an appropriate manner.

Figure 10:
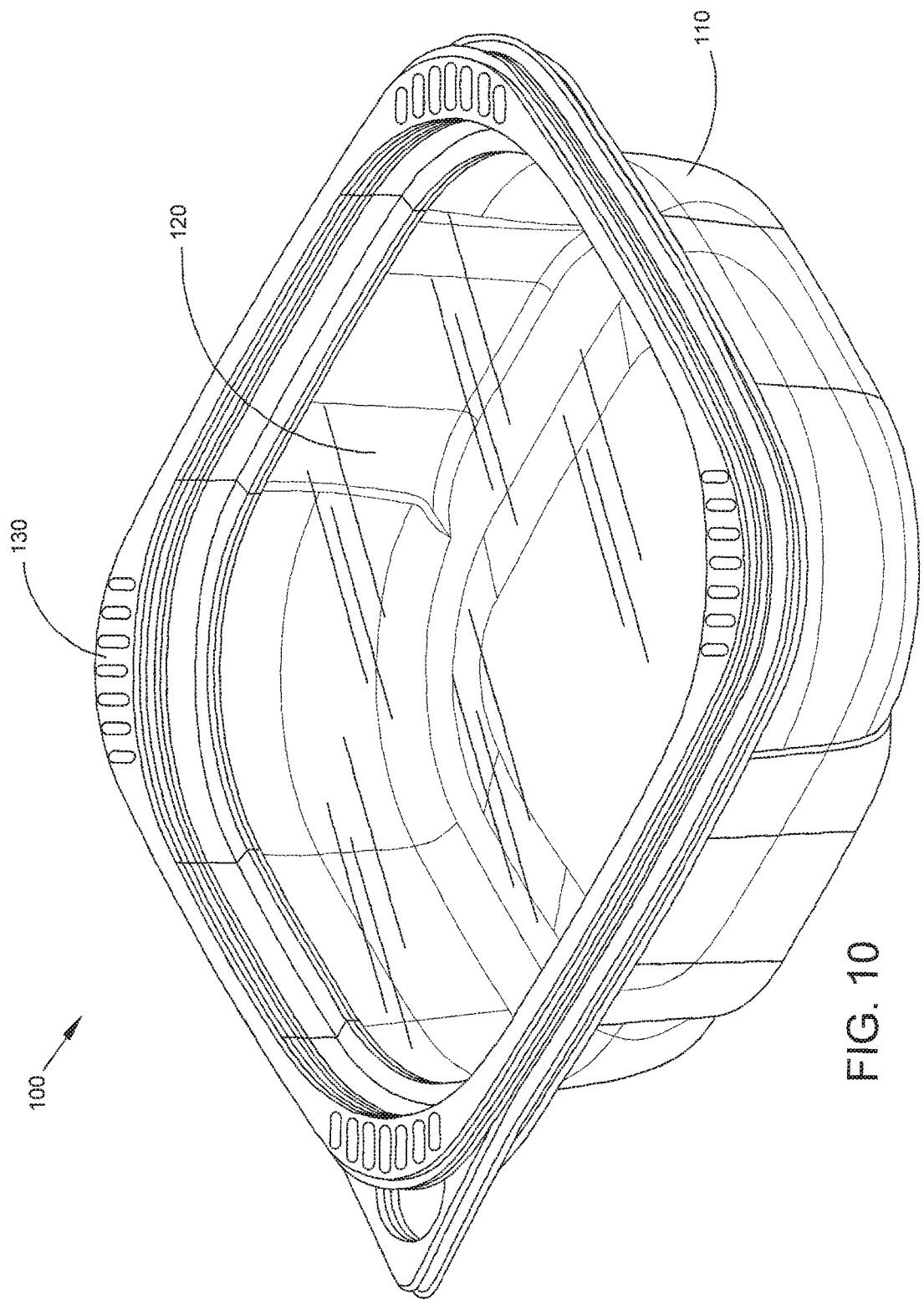

FIG. 10 is an isometric view, similar to FIG. 1, of an exemplary product package 100 where depicted is a tray/tub 110, a film or sealing film 120, and a lid 130 where, as described above, the sealing film 120 is releasably attached to a ledge on a sidewall of the tray 110 and fixedly attached to a flange of the lid. This is a typical configuration for the product package, according to an embodiment of the present subject matter, as it might appear on a store shelf.

FIG. 11 illustrates an isometric partially-exploded view of the exemplary product package 100 during assembly. At this point of the assembly, the sealing film 120 has been releasably attached to a ledge on a sidewall of the tray 110 and the lid 230 has not yet been put in place.

FIG. 12A depicts an isometric partially-exploded view of the product package 100 with the sealing film 120 releasably attached to the tray 110 as discussed above, and the lid 230 is then placed on the tray 110 as indicated by the arrow. The lid 230 will be prepared in a manner that when placed on the tray 110 the sealing film 120 will become fixedly attached to the lid. FIG. 12B is a partial cross-sectional close-up view of the product package 100 shown in FIG. 12A. Again, the arrow in FIG. 12B indicates the lid 230 being placed on the tray 110 as described above.

Figure 13B:
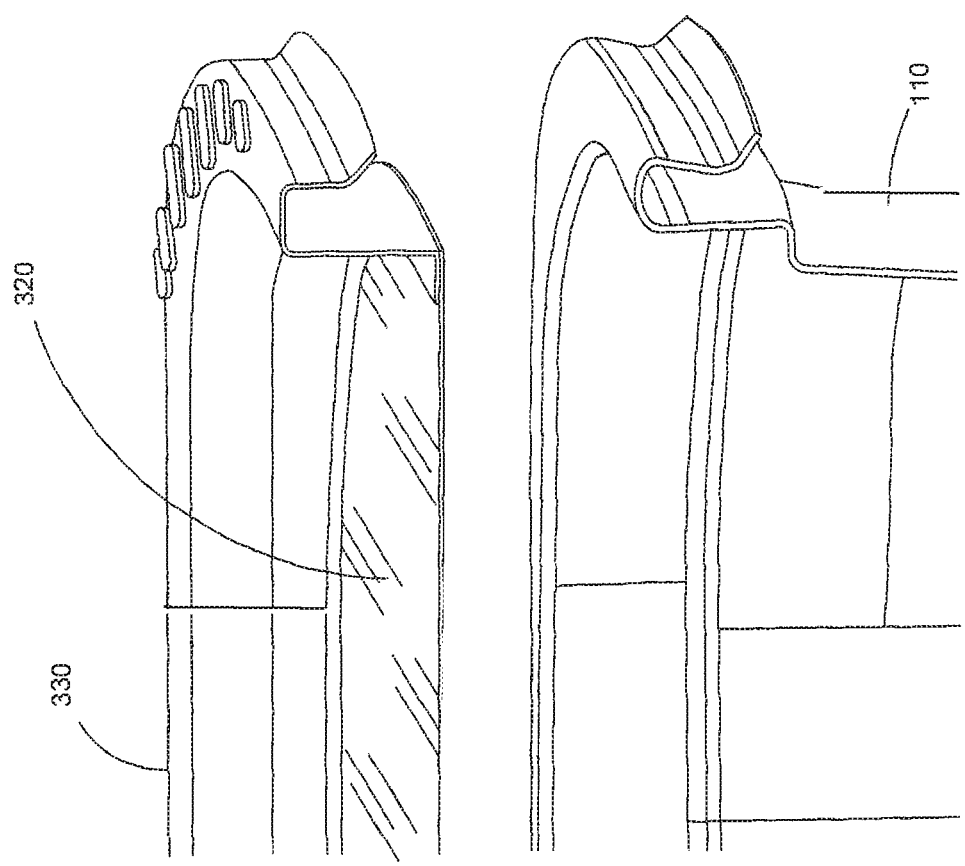

FIG. 13A illustrates an isometric partially-exploded view of the product package 100 when a consumer opens the package. The consumer removes the lid 330 from the tray 110 and since the sealing film 320 has been fixedly attached to the lid and releasably attached to the tray, the sealing film is lifted away from the tray along with the lid, thus allowing the consumer access to the product within the package. FIG. 13B is a partial cross-sectional close-up view of the product package 100 shown in FIG. 13A.

Figure 14:
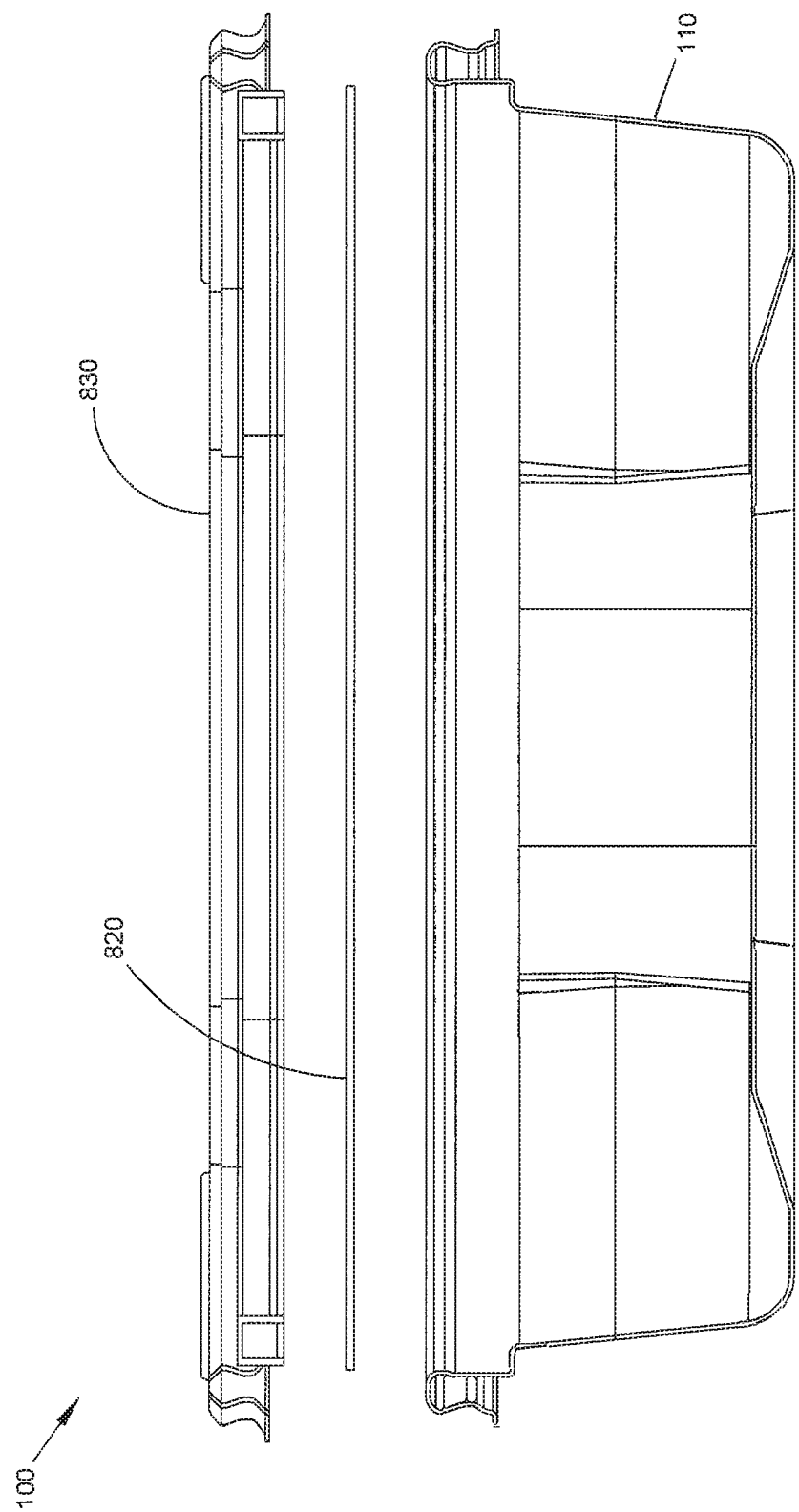

FIG. 14 is a cross-sectional exploded view of the product package 100 showing the tray 110, the lid 830, and the sealing film 820. FIG. 14 indicates that the sealing film 820 is/will be fixedly attached/sealed to the lid 830 and is/will be releasably attached/sealed to the tray 110, as described in detail above.

FIGS. 15-19 are various depictions of another exemplary product package illustrating details of the interaction of various parts during assembly and/or use of the product package according to an embodiment of the present subject matter. For the sake of simplicity, no product is shown in the package or discussed during the various stages of assembly and/or use of the package although those of skill in the art will readily understand that product would be placed in the product package at the appropriate time during assembly and in an appropriate manner.

Figure 15:
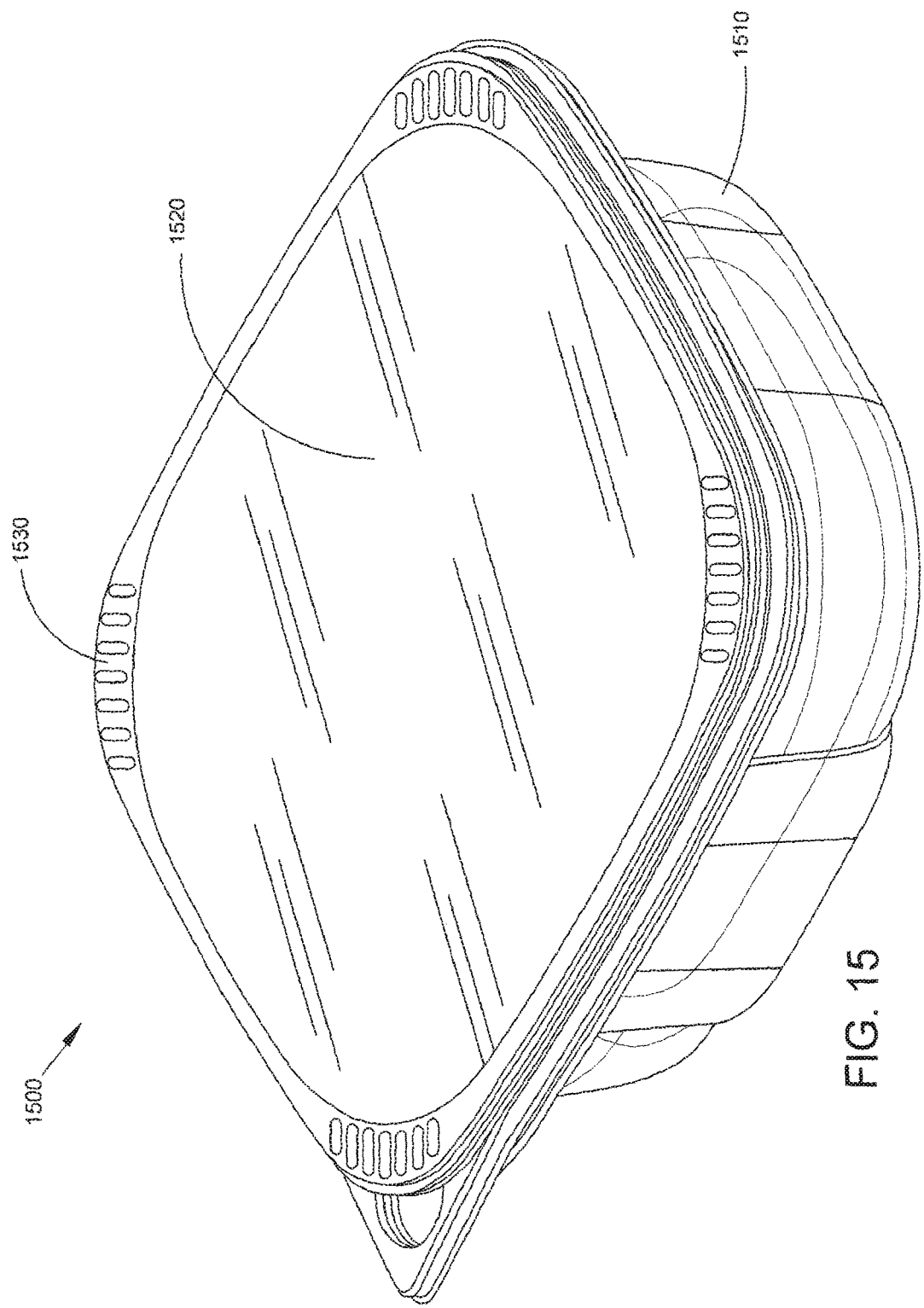

FIG. 15 is an isometric view of another exemplary product package 1500 where depicted is a tray/tub 1510, a film or sealing film 1520, and a lid 1530. As described above with respect to FIG. 8, the sealing film 1520 is releasably attached, for example, to a top ledge on a sidewall of the tray 1510 or to the top of the rim of the sidewall of the tray 1510 (the following discussion will refer to the rim of the tray for simplicity and should not be construed as limiting the scope of the disclosure in any way), and the sealing film 1520 is fixedly attached to an underside portion of the lid 1530, an embodiment of which will be shown in further detail below. This is also a typical configuration for the product package 1500, according to an embodiment of the present subject matter, as it might appear on a store shelf.

Figure 16:
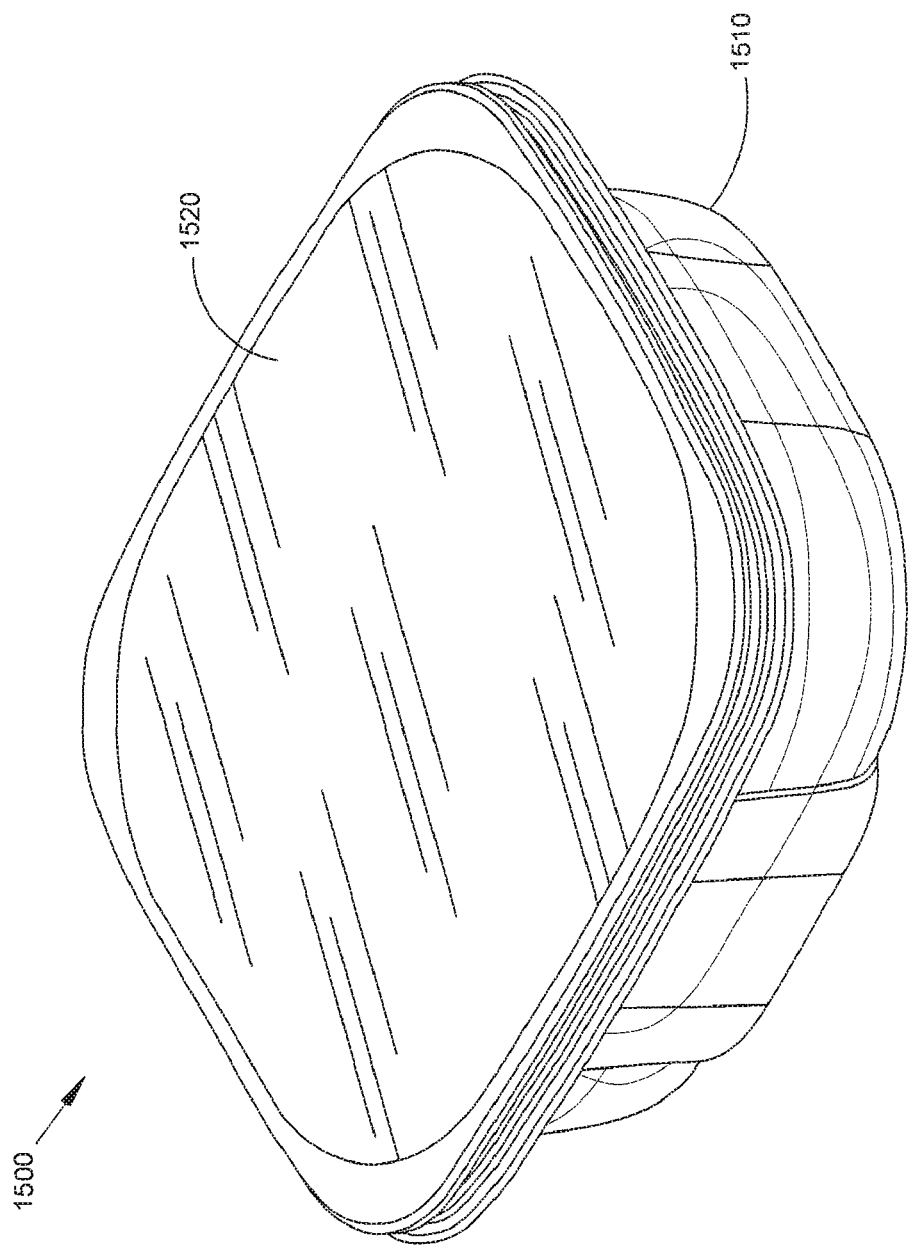

FIG. 16 depicts an isometric view of the exemplary product package 1500 during assembly. At this point of the assembly, the sealing film 1520 has been releasably attached to the rim of the tray 1510 and a lid has not yet been placed thereon.

Figure 17B:
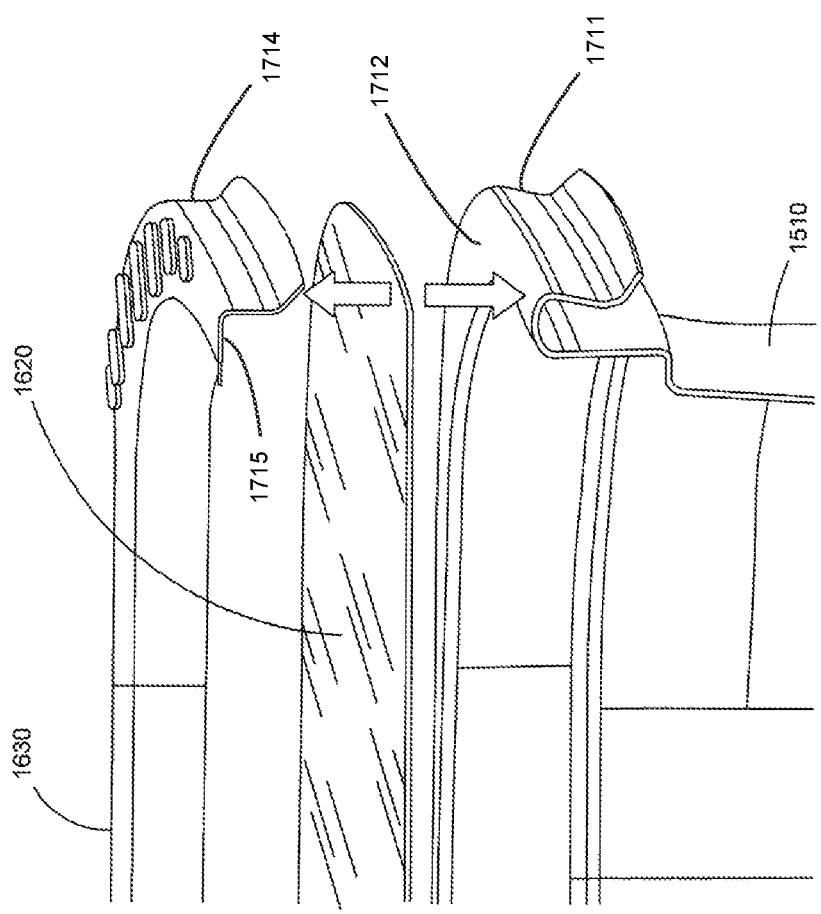

FIG. 17A depicts an isometric exploded view of the product package 1500 with the sealing film 1520 dimensioned so as to fit on the rim of the tray 1510, and the lid 1630 positioned above and configured to attach to the tray 1510 with the sealing film 1520 disposed therebetween. As discussed above, the sealing film 1520 will be releasably attached to the tray 1510 and then the lid 1630 will be then placed thereon, where the lid 1630 will have been prepared in a manner that the sealing film 1520 will become fixedly attached to the lid 1630. FIG. 17B is a partial cross-sectional close-up view of the product package 1500 shown in FIG. 17A. FIG. 17B shows tray 1510, rim surface 1712, rim sidewall 1711, sealing film 1620, lid 1630, lid surface 1715, and lid sidewall 1714. The downwardly-pointing arrow indicates the sealing film 1620 releasably attached to the rim surface 1712 of the rim of the tray 1510 and the upwardly-pointing arrow indicates the sealing film 1620 fixedly attached to the lid surface 1715 of the lid 1630.

FIG. 18 illustrates an isometric partially-exploded view of the product package 1500 when a consumer opens the package. The consumer removes the lid 1830 from the tray 1510 and since the sealing film 1820 has been fixedly attached to the lid and releasably attached to the tray, the sealing film is lifted away from the tray along with the lid, thus allowing the consumer access to the product within the package 1500.

Figure 19:
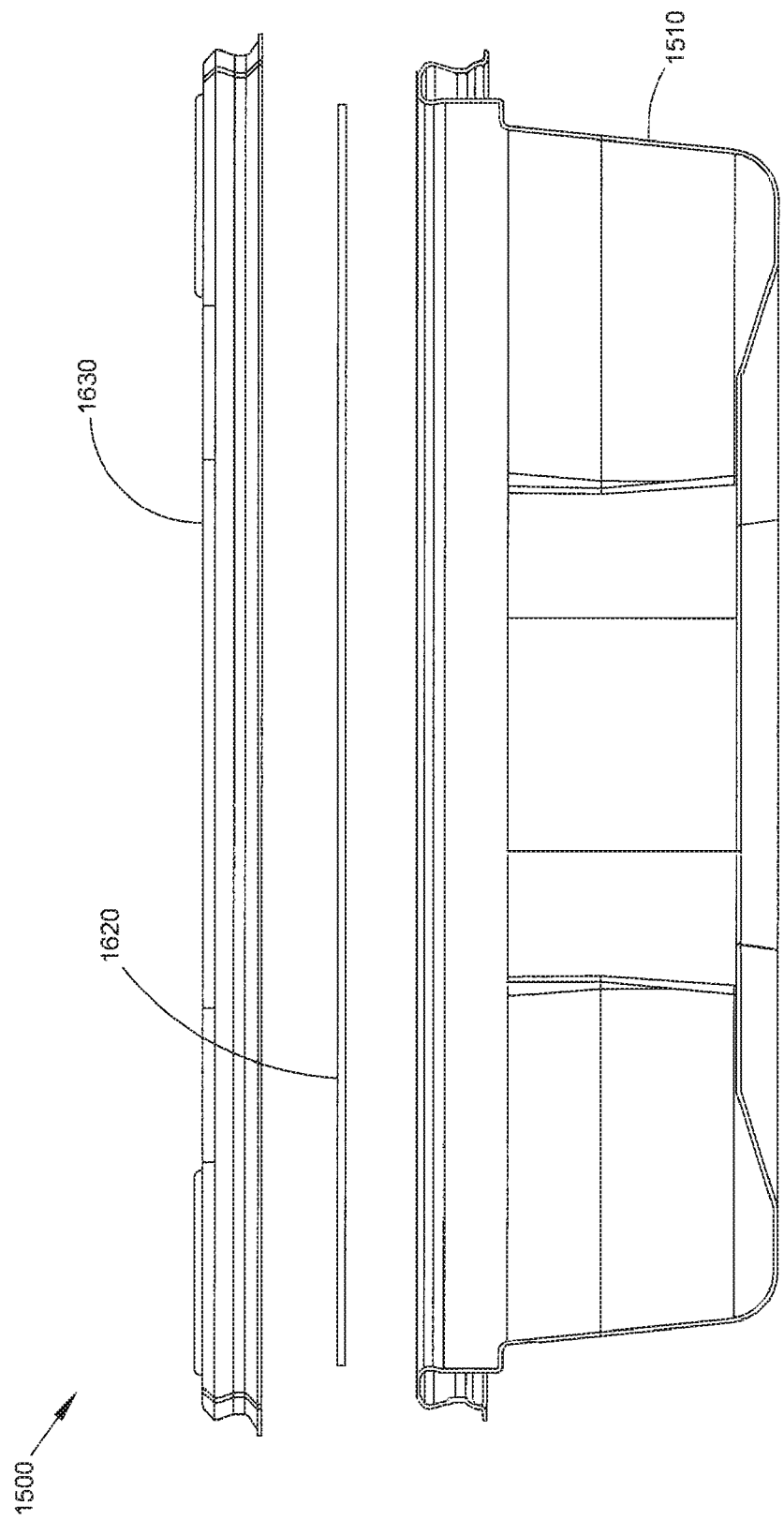

FIG. 19 is a cross-sectional exploded view of the product package 1500 showing the tray 1510, the lid 1630, and the sealing film 1620. FIG. 19 indicates that the sealing film 1620 is/will be fixedly attached/sealed to the lid 1630 and is/will be releasably attached/sealed to the tray 1510, as described in detail above.

An embodiment includes an apparatus, comprising a tray having a base connected to at least one sidewall which extends away from the base terminating at a rim and comprising a ledge formed between the base and the rim; a film releasably attached to the ledge to seal an interior space of the tray from an external environment; and a lid dimensioned to receive the rim when the lid is positioned on the tray, where the lid is fixedly attached to the film, and where the lid is configured to allow a user to access the interior space by disengaging the lid from the tray thereby removing the film from the ledge.

In another embodiment, the lid comprises a channel for receiving the rim when the lid is positioned on the tray. In yet another embodiment, the lid comprises a frame having a channel formed by an outer lid wall and an inner lid wall, where the inner lid wall comprises a flange for attaching to the film, and the frame may circumscribe an opening in the lid with the film spanning the opening.

In still another embodiment, the rim is formed in an inverted U-shape comprising an inner rim wall and an outer rim wall, and the lid comprises a channel formed by an inner lid wall and an outer lid wall for receiving the rim when the lid is positioned on the tray, and where the lid engages the rim by an interference fit between the inner lid wall and the inner rim wall. Other embodiments include a flange attached to the inner lid wall, where the flange is fixedly attached to the film. Further, the flange may mate with the ledge with the film disposed between the flange and the ledge.

In yet still another embodiment, the base is connected to four sidewalls that are arranged to approximate a rectangle.

In a further embodiment, the film comprises a design.

Yet a further embodiment includes an apparatus, comprising a tray having a base connected to at least one sidewall which extends away from the base terminating at a rim, a film releasably attached to the sidewall to seal an interior space of the tray from an external environment, and a lid dimensioned to receive the rim when the lid is positioned on the tray, where the lid is fixedly attached to the film, and where the lid is configured to allow a user to access the interior space by disengaging the lid from the tray thereby removing the film from the sidewall.

A still further embodiment includes a method for accessing a product contained within a storage device, where the method includes the steps of providing a storage device comprising a base connected to at least one sidewall which extends away from the base terminating at a rim and comprising a ledge formed between the base and the rim, placing a product in an interior space of the storage device, releasably attaching a film to the ledge to seal the interior space of the tray from an external environment, providing a lid dimensioned to receive the rim when the lid is positioned on the storage device, fixedly attaching the lid to the film, and accessing the product in one step by disengaging the lid from the storage device thereby removing the film from the ledge.

In yet still a further embodiment, the method includes the step of performing a gas flush of the interior space after the product is placed in the interior space. In an even further embodiment, the method further includes the step of replacing the lid on the storage device.

While this specification contains many specifics, these should not be construed as limitations on the scope of the claimed subject matter, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results, so long as the result is consistent with the description provided above.

While some embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A package comprising:
    a tray having a base connected to at least one sidewall which extends away from the base terminating at a rim, the tray defining an inner chamber, the inner chamber being an interior space of the tray, the rim circumscribing an outer perimeter of the inner chamber, the rim comprising a rim surface;
    a film releasably attached to the rim surface to seal the inner chamber from an external environment;
    a lid dimensioned to receive the rim when the lid is positioned on the tray, the lid being positioned on the tray, the lid defining a central aperture and comprising a lid sidewall and a lid surface;
    the film comprising a first film surface and an opposing second film surface, the first film surface being permanently and directly affixed to the lid surface such that the lid is fixedly attached to the film, the second film surface being releasably sealed to the rim surface such that when a user draws the lid away from the tray, the first film surface remains affixed to the lid surface while, at the same time, the second film surface peels apart from the rim surface;
    wherein said lid is configured to allow a user to access the inner chamber serving as the interior space by peelably disengaging said lid from the tray thereby removing the film from the ledge.

2. The package of claim 1, wherein the film is sandwiched between the inner lower surface and the outer upper surface.

3. The package of claim 1, wherein the film hermetically seals the inner chamber.

4. The package of claim 1, wherein the lid sidewall is wrapped directly about the second film.

5. The package of claim 1, wherein the rim further comprises a rim sidewall, and the lid sidewall engages the rim sidewall by virtue of an interference fit when the lid is positioned on the tray.

6. A package comprising:
    A lid comprising a member having an inner lid perimeter defining a central aperture and an outer lid perimeter connected to a lid sidewall, the member having an inner lower surface;
    a tray defining an inner chamber and comprising a rim circumscribing an outer perimeter of the inner chamber, the rim comprising an outer rim perimeter connected to a rim sidewall, the rim having an outer upper surface;
    a film comprising a first film surface and an opposing second film surface, the first film surface being permanently and directly affixed to the inner lower surface, the second film surface being releasably sealed to the outer upper surface such that when a user draws the lid away from the tray, the first film surface remains affixed to the inner lower surface while, at the same time, the second film surface peels apart from the upper outer surface.

7. The package of claim 6, wherein a bond strength between the inner lower surface and the film exceeds a bond strength between the outer upper surface and the film.

8. The package of claim 7, wherein the film is sandwiched between the inner lower surface and the outer upper surface.

9. The package of claim 8, wherein an adhesive is spread between the outer upper surface and the second film surface, the adhesive enabling the second film surface to peelably release from the outer upper surface while the first film surface remains directly and permanently affixed to the inner lower surface.

10. The package of claim 9, wherein the film is continuous such that the film does not define any apertures.

11. The package of claim 9, wherein the film hermetically seals the inner chamber.

12. The package of claim 11, wherein the film is transparent and comprises a flexible portion.

13. The package of claim 12, wherein the flexible portion is centrally disposed.

14. The package of claim 13, wherein the flexible portion exclusively separates the hermetically sealed inner chamber from ambient environment, such that if the flexible portion was punctured, the hermetic seal of the inner chamber would be breached.

15. The package of claim 13, wherein the first film surface and the second film surface are flat.

16. The package of claim 15, wherein the second film surface is exclusively in-contact with the adhesive and/or the outer upper surface.

17. The package of claim 6, wherein the inner lower surface bears against the outer upper surface through the film.

18. The package of claim 6, wherein the lid sidewall is wrapped directly about the second film.

19. The package of claim 6, wherein the lid sidewall is wrapped directly about the rim sidewall when the lid is engaged with the tray to hermetically seal the inner chamber.

20. The package of claim 19, wherein the lid sidewall engages the rim sidewall by virtue of an interference fit.

* * * * *